2,863,933

ELECTRIC CURRENT PRODUCING CELL AND METHOD OF PRODUCING CURRENT USING THE SAME

Leonard John Minnick, Cheltenham, and Cyril Presgrave, Gwynedd Valley, Pa., assignors to G. and W. H. Corson, Inc., Plymouth Meeting, Pa., a corporation of Delaware No Drawing. Application October 27, 1952
Serial No. 317,136

20 Claims. (Cl. 136—6)

The present invention relates to an electric current-producing cell, and to a novel method of generating electric current; and, more particularly, the invention relates to a cell of the type described in which the electrolyte comprises a combination of certain salts with anhydrous liquid ammonia. The invention also relates to a battery comprising two or more of such simple cells.

All of the electric current-producing cells and batteries in general use today utilize an aqueous solution of some acid or salt as an electrolyte. All of these cells and batteries perform under standard conditions of atmospheric pressure and temperature, and most of them can be stored for reasonable periods of time without deterioration. The effect of increasing the temperature in storage, tends, in general, to reduce the shelf-life of these cells and batteries. Reduction in temperature causes them to become inoperative. The chief reason for this inoperative characteristic of conventional cells and batteries at low temperatures is the choice of electrolyte employed. While the introduction of certain salts can be used to lower the freezing point of the aqueous solution, it is still impossible to obtain good cell characteristics at temperatures very much below the freezing point of water. In the case where temperatures greatly below the freezing point of water are encountered, there is no aqueous type cell that will operate.

It is the principal object of the present invention to provide an electric current-producing cell which readily operates at temperatures below the freezing point of water.

A further object of the invention is to provide an electric current-producing cell which not only operates at temperatures well below the freezing temperature of water but also operates at normal atmospheric temperatures.

Still another specific object of the invention is to provide an electric current-producing cell possessing the characteristics discussed above which can be recharged after having been discharged.

Still another object of the invention is to provide a novel method of generating electric current by chemical means at temperatures well below the freezing point of water as well as at ordinary atmospheric temperatures.

Other objects will become apparent from a consideration of the following specification and claims.

The electric current-producing cell of the present invention comprises an anode comprising an electropositive metal and a cathode; and an electrolyte the solvent of which comprises anhydrous liquid ammonia; the electrolyte adjacent said anode comprising a solution of a salt the cation of which is a metal corresponding to that of the anode dissolved in said anhydrous liquid ammonia, and the electrolyte adjacent said cathode comprising a solution in said anhydrous liquid ammonia, of a salt the cation of which is selected from the group consisting of ammonium and metals which develop an electrolytic potential in liquid ammonia of at least 0.75 volt less than that developed by the metal of said anode in liquid ammonia.

The method of generating current in accordance with the present invention comprises bringing the stated anode in contact with the anolyte liquid, and the cathode in contact with the catholyte liquid, the catholyte and anolyte liquids being at least in ionic flow relationship; and completing the circuit between the anode and cathode. The mechanism by which an electric current is produced will be discussed more in detail hereinafter.

It has been found that the described cell operates at temperatures ranging from 50° C. to considerably below the freezing point of water. In addition, it has been found that the efficiency of the cell is actually improved by the reduction of the temperature. The lowest temperature at which the cell will operate is governed primarily by the freezing point of the electrolyte. Liquid ammonia freezes at about —77° C., however, the freezing point is lowered by the presence of salts comprising those mentioned above dissolved therein. Moreover, although liquid ammonia boils at about —33° C., the boiling point thereof can be raised to atmospheric temperatures by the inclusion of the stated salts alone or in conjunction with the application of pressure.

A further discovery in connection with the cell of the invention is the magnitude of the voltage that may be developed thereby. Most conventional cells generate a maximum of about two volts. The cell of the present invention may develop voltages as high as about 4 volts.

Referring to the anode, it comprises, as stated an electro-positive metal. In general, any metal above iron in the electrochemical series, particularly lithium, sodium, potassium, caesium, rubidium, calcium, strontium, barium, magnesium, zinc, aluminum, beryllium, manganese, and the like, or mixtures thereof as well as alloys containing one or more of these metals, is suitable. Of the stated metals, lithium, calcium, magnesium, and zinc, particularly lithium, are preferred.

The metal of the anode need not be in a rigid solid state. In co-pending application Ser. No. 672,704, now Patent No. 2,615,838, is disclosed and claimed a method for producing alkali and alkaline earth metals by the electrolysis of a solution of a salt of the metal in a non-aqueous solvent, such as liquid ammonia. By this process, the alkali or alkaline earth metals can be plated out, and, depending upon the particular metal, may be obtained either in solid metallic form or as a paste or as an insoluble metal-ammonia liquid referred to as a "bronze" liquid. The liquid "bronze" is believed to be a blend or solvated compound between the anhydrous ammonia and the metal, and an excess of ammonia may be present. The concentration of metal in ammonia is generally at least about 7% to form the bronze. In higher concentrations some of the metal may be in suspension or in colloidal solution in the compound, and these liquids may contain up to 90% of the metal, the balance being ammonia. When the concentration is still higher the stated paste is formed, and the concentration of the metal in the paste usually exceeds about 90% and may be as high as about 99%. The liquid "bronze" possesses a metallic luster and will usually be of a yellow or bronze color although in some instances it may possess grayish characteristics. The term "bronze" is used herein to designate such coloration and to distinguish it from a liquid possessing a blue coloration which results when a small amount of the metal is dissolved in liquid ammonia in a low concentration. The above-mentioned paste may be colored reddish brown, dark brown, or even black, and will possess the characteristic metallic luster. The paste can also be formed by adding more of the metal to the bronze liquid. The metal in solid form may be obtained from the "bronze" liquid or paste by evaporation of the solvent. The "bronze" or paste or metal resulting from the evaporation of solvent from the bronze or paste can be used as the anode in accordance with the present invention. The bronze or paste will readily float upon the anhydrous liquid ammonia-containing anolyte employed in the present cell. The use of lithium as anode is, as stated, preferred, since it is very stable even in the form of the liquid "bronze" or paste. Thus, a 10% solution of lithium bronze (the remainder being liquid ammonia) will keep in a closed container for several years with very slight evidence of spoilage, and if care be taken in sealing the material, no deterioration will be evidenced.

The cathode may be selected from a wide range of elements that will conduct an electric current. Thus, the cathode may be a material that is inert to the electrolyte such as platinum, electrolytic carbon, boron, zirconium, tantalum, or the like. Of this group carbon is the preferred material. The cathode, however, may, if desired, comprise a metal which is reactive with the catholyte anions under certain circumstances. As stated, the electrolyte in contact with the cathode comprises a salt the cation of which may be a metal which develops an electrolytic potential in liquid ammonia at least 0.75 volt less than the metal of the anode. When such a salt is selected, the metal of the cation plates out, during discharge of the cell, at the cathode; and, during recharging of the cell, the plated out metal is re-converted to the stated salt. Thus, the cathode may comprise such a metal corresponding to the cation of the metal salt of the catholyte. Such metals are discussed more in detail hereinafter in connection with the metal salt of the catholyte. Even where a metal salt is employed in the catholyte, the cathode at the time the cell is fully charged, may be one of the afore-mentioned inert materials. In this case again, the metal cation of the salt will plate out on the cathode during discharge of the cell and be re-converted to the salt during charging of the cell.

With respect to the electrolyte, it is made up of a combination of certain salts and anhydrous liquid ammonia. Anhydrous liquid ammonia alone or a mixture of liquid ammonia with a minor amount of one or more liquid amines containing from 1 to 8 carbon atoms such as methylamine, ethylamine, pyridine and the like may be used. Anhydrous liquid ammonia is the cheapest of the stated liquids, and for this and other reasons it is desired that at least the preponderant proportion, for example at least about 50%, of any mixture of amines therewith be liquid anhydrous ammonia. Preferably when a mixture of such liquids is used the amine component will make up less than about 25% of such mixture. The use of liquid anhydrous ammonia as substantially the sole anhydrous liquid of the electrolyte of the type stated is particularly preferred. Since ammonia is at least the preponderant liquid solvent employed the invention will be described herein in terms of liquid ammonia as the electrolyte solvent. Other materials which will not interfere with the desired electrolytic action may be included in the anhydrous liquid ammonia for various purposes. Thus, a small amount of methyl cellulose, or the like, may be dissolved in the liquid to prevent the formation of sludge.

The electrolyte may be divided, for the purposes of discussion, into two components—the portion which is to be adjacent the anode, referred to herein as the "anolyte," and the portion adjacent the cathode referred to herein as the "catholyte." The anolyte comprises a salt, or a mixture of salts, of the metal or metals of which the anode is composed, dissolved in the liquid ammonia. Thus, for example, where the anode comprises lithium metal, the anolyte will comprise a lithium salt or salts dissolved in the anhydrous liquid ammonia. The salt will be such as is freely soluble in liquid ammonia, that is, is capable of dissolving in liquid ammonia to the extent providing at least about a 10% concentration by weight. Therefore, the anion of the particular salt selected may vary widely depending on the particular cation thereof. Examples of salts of general applicability are the thiocyanates, perchlorates, fluoborates, cyanates, nitrates, nitrites, and the like. Of these, the thiocyanates and perchlorates are particularly advantageous since they are generally highly soluble in liquid ammonia and are readily obtainable in an anhydrous condition, a property which is desirable for reasons pointed out hereinafter.

The concentration of the salt in the anolyte may vary widely for the purpose of generating a current in accordance with the present invention. In this respect, the cell system of the present invention is analogous to aqueous secondary cell systems, and the concentration of salt in the anolyte will be governed by the same factors considered in aqueous systems. In general, the capacity of the cell increases, up to a certain point, as the concentration of salt in the anolyte increases. For most practical purposes in order to provide a practically significant capacity the concentration of the salt in the anolyte is at least about 10%, by weight. Another factor which may be taken into consideration in selecting the concentration of the anolyte salt in the anolyte is the tendency of the anode metal to go into solution in the anolyte either as an ion through reaction or combination with the ammonia or as metal. This tendency, in general, decreases as the concentration of salt in the anolyte increases, as in the case in aqueous systems. However, as is also the case in aqueous systems the level of dilution of salt in the electrolyte at which solution pressure of metal becomes significant differs depending upon the metal. The more electropositive the metal, the greater its solution pressure and hence its tendency to go into solution in the liquid ammonia unless such tendency is retarded by the presence of sufficient salt, in solution in the liquid ammonia. Thus, there is little tendency for the solution pressure of zinc, or the like, to be effective even at concentrations of salt in the lower end of the range. The alkali and alkaline earth metals, on the other hand, which are highly electropositive, particularly a "bronze" solution or paste thereof as discussed above, are highly soluble in liquid ammonia, and in this case it is desirable to employ a relatively high concentration of salt in the anolyte. In specific instances, the concentration may be about 20 to 30%, by weight, or even higher, depending upon the particular salt employed. Concentration may, in fact, be any value up to the saturation point of the particular salt in the anhydrous liquid ammonia, and even if the salt is used in an amount in excess of its solubility, the excess salt merely sinks to the bottom of the cell and the cell will operate satisfactorily. As stated previously, the presence of the salt dissolved in the anolyte raises the boiling point and lowers the freezing point of the anhydrous liquid ammonia, and the boiling and freezing points may be controlled depending upon the concentration of the salt in the anolyte.

The catholyte will comprise in solution in the anhydrous liquid ammonia a salt, the cation of which may be ammonium or a metal of the type more fully described below and the anion of which may be of the same type as that discussed above in connection with the anolyte salt or salts. Preferably, the anion of the catholyte salt corresponds to that of the anolyte salt employed. Various investigators have studied and measured the electrolytic potentials of metals in liquid ammonia, and their findings are reported in the literature. In accordance with the present invention, when a metal salt is employed in the catholyte the cation must be a metal that possesses an electrolytic potential in liquid ammonia of at least 0.75 volt less than that possessed by the metal of the anode in liquid ammonia. The alkali and alkaline earth metals possess high electrolytic potentials in liquid ammonia with zinc, magnesium, aluminum, beryllium and manganese having electrolytic potentials somewhat less; whereas metals, such as iron, nickel, copper, lead, mercury, and the like, possess relatively low positive potentials or negative potentials. The salt employed in the catholyte may, therefore, possess one of such metals as its cation so long as the algebraic difference between the electrolytic potential of the metal of the cation in liquid ammonia and that of the anode metal in liquid ammonia is at least 0.75 volt. Thus, where, for example, the anode metal comprises a highly electropositive metal, such as lithium, the cation of the catholyte salt may be a metal possessing moderate electrolytic potential, such as aluminum, whereas when, for example, the anode metal comprises a moderately electropositive metal such as zinc, the cation of the catholyte salt will normally be an electronegative metal. It will be understood that the catholyte may contain a mixture of such salts, including a mixture of an ammonium salt or salts and a metal salt or salts. It is also to be understood that salts other than those of the type discussed above may be present in the catholyte for whatever purpose desired. For example, a small amount of a chloride may be added to the catholyte for the purpose of lowering the solubility of the cathode metal in the catholyte.

The amount of salt associated with the catholyte may vary widely depending upon the desired capacity and life of the cell, and in this regard the same factors governing aqueous secondary systems are applicable to this system. The capacity and operating life of the cell is, in general, proportional to the amount of cation available for displacement by the anode metal and for release at the cathode, and for most purposes the concentration of salt in the catholyte will generally be at least about 5%, by weight, preferably at least about 10%, by weight. The amount of salt in the catholyte, may be well in excess of these figures, since any excess over that required for discharging the cell does not deleteriously affect the operation of the cell. In fact, the salt may be present in excess of its solubility, particularly in the case of moderately soluble salts such as lead salts. During discharge of the cell, in such situation, the undissolved salt goes into solution as the cation of the salt in solution plates out at the cathode.

In the preferred embodiment of the invention, anhydrous or substantially anhydrous salts are employed in making up the anolyte and catholyte. However, limited amounts of water may be associated with the salt, if desired, without seriously affecting the reaction that takes place due to the fact that the cell will purge itself of water or may be purged of water by placing the cell under charging conditions. In purging of water, a sludge of the hydroxide of the anode metal will be formed. Because of the introduction of foreign solids to the cell, the use of a salt containing as little water as practical is recommended. The particular salt employed and the ease with which it may be dried are among the governing factors. The introduction of an alkali metal salt containing more than 5% of water is not recommended, and if water is associated with the salt it is advantageously below 1%. In the case of the alkaline earth metal salts, the use of a salt containing less than about 1% of water is desirable and the salt advantageously contains less than about 0.5% of water.

In making up the cell of the present invention the electrolyte may be in fluid liquid condition or may be in the form of a paste as in the conventional so-called "dry" cells. Thus, the anolyte and/or catholyte may be mixed with a suitable absorbent material such as glass fiber, and the like, to provide a mass which will not readily spill.

The particular design and construction of the cell of the present invention may vary widely depending upon the particular use intended for the cell. In one form of the cell there may be employed a vessel containing a cylindrical chamber surrounded by an annular chamber. The two chambers may be separated by a porous diaphragm. The inner chamber may be the cathode compartment containing the cathode and catholyte. The outer chamber may be the anode compartment containing the anode and anolyte. Suitable contact terminals will be provided on each chamber to conduct current.

When the anode metal is in the form of the above-discussed liquid "bronze," the bronze may simply be floated on top of the anolyte or other suitable arrangement may be made so that the liquid "bronze" may contact the anolyte. When the anode metal is in the form of a "bronze" liquid or paste it may be desirable to provide contact between it and the anode terminal by means of a suitable conductor metal that does not react with the anode metal, such as iron, platinum, tungsten, and the like.

One or more of the components of the cell may be brought into contact with the other components at a particular desired time when it is desired to begin generating current. Thus, in one embodiment the anhydrous liquid ammonia, or the anolyte, or the catholyte, may be separated from the other components, for example, in a sealed capsule which can be readily ruptured. At the desired time, the capsule may be ruptured thus bringing the liquid into contact with the desired components. The instant that the contact occurs, the potentials of the cell are established and, the circuit being completed, current will flow through the circuit. Likewise, when a liquid "bronze" is employed, as the anode, the "bronze" may be kept out of contact with the other components of the cell until the desired time of operation. A cell made in accordance with the above-discussed embodiment may, if desired, be used in applications where only a single discharge of the cell is desired without any re-charging of the cell being contemplated. Of course, as is common in ordinary "storage" cells, all the components of the cell may be in contact, requiring only the completion of the circuit to cause the generation and flow of current. Herein and in the claims where the cell system is defined, it will be understood to include the embodiment where one or more of the components thereof is temporarily out of contact with the other components but potentially in contact therewith.

Referring further to the construction of the cell, since liquid ammonia boils at about $-33°$ C., it will be necessary to insure that the ammonia is not evaporated and lost under the conditions of storage and operation. As stated, salt dissolved in the ammonia will raise the boiling point thereof so that in certain circumstances, the boiling point of the electrolyte will be such that excessive ammonia will not be lost even at atmospheric conditions. However, the cell may be so constructed that the electrolyte is sealed from the atmosphere and held under sufficient pressure to maintain it as a liquid at normal atmospheric or room temperatures. Since in certain circumstances, a small amount of gases are generated during discharging and recharging of the cell, a vent equipped with a suitable valve can be provided. A further factor that may be taken into consideration is the deleterious effect of moisture resulting in the formation of the hydroxide sludge mentioned previously. A certain amount of such reaction is permissible without affecting to any appreciable extent the performance of the cell. It is desirable, however, to seal the cell against the intrusion of atmospheric air or moisture. Thus, the above-mentioned vent can be such as will permit the discharge of generated gases while preventing the ingress of atmospheric air or moisture. A simple check valve or a trap containing moisture-absorbing material inert to ammonia may be used.

The cell may be constructed from a wide variety of relatively cheap and available materials, for example, iron or steel, glass or ceramic material, rubber, or synthetic rubber-like materials, synthetic resins, and the like.

The electrodes may be of any desired shape, such as flat sheets, rolls, cylinders, or the like. When the stated "bronze" or paste is employed as the anode it may be employed as such or absorbed on a suitable material such as glass wool, and the like. Since in certain instances, the catholyte will be reactive with the anode metal, a porous, permeable or semi-permeable diaphragm, such as a porous ceramic sheet, or the like, will usually be employed to divide the cell into cathode and anode compartments. In the case of certain thiocyanate salts, however, there is little tendency for reaction between the catholyte and the anode metal, and the use of a diaphragm in this case is not required.

In the generation of electric current in accordance with the present invention, the stated anode is brought into contact with the stated anolyte and the stated cathode is brought into contact with the stated catholyte. The catholyte and anolyte are at least in ionic flow relationship with each other, that is to say, the anolyte and catholyte may be separated by means of a porous, or permeable or semi-permeable diaphragm through which ions may move from one compartment to the other. The circuit between the anode and cathode is completed causing current to flow.

The following theory is advanced by way of explaining the mechanism by which the cell of the present invention operates, although it will be realized that the various phenomena described take place simultaneously. The anode metal goes into solution in the anolyte giving up electrons and becoming positively charged ions, or cations. The anolyte will, as stated previously, contain metal cations corresponding to the metal of the anode by virtue of the presence of the salt dissolved therein. The metal cations migrate toward the cathode and displace the cation of the catholyte salt which latter cation takes on electrons at the cathode. The displaced cations of the catholyte salt become, in the case they are metal cations, plated out at the cathode, or become converted to ammonia and hydrogen gas where they are ammonium ions. This action continues until either the circuit is broken or the cell spends itself through exhaustion of the anode or of the catholyte salt. The cell may be recharged by simply reversing the flow of current, and with the current in this case coming from an external source, so that the anode metal reforms by plating out at the anode and the original catholyte salt reforms.

The above-described cell may take the form of two embodiments depending upon the nature of the catholyte salt employed: (1) where the catholyte salt is an ammonium salt, and (2) where the catholyte salt is a metal salt, the cation being of a metal of the type described.

In the first-mentioned embodiment, the cathode will be of an inert material such as carbon, platinum, boron, zirconium, tungsten, tantalum, or the like, and the catholyte salt will be an ammonium salt or a mixture of ammonium salts. Upon operation of the cell, the ammonium ions in the catholyte are displaced by the anode metal and gain electrons at the cathode to form ammonia, which becomes part of the liquid ammonia solvent, and hydrogen gas which is released at the cathode. This type of cell, after it has discharged may be recharged by reversing the flow of current and thus reversing the electrochemical reaction. Thus, upon recharging the cell the anode metal cations which are adjacent the cathode migrate to the anode and are plated out thereon. These anode metal cations are replaced, in the catholyte, by ammonium ions in accordance with the following equation:

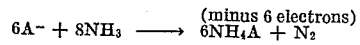

where A⁻ represents the anion of the catholyte salt. It will be noted that in recharging the cell of this embodiment nitrogen gas is released, while hydrogen gas is released during the discharge of the cell. Thus, the only material that is lost to the system through discharge and recharge of the cell is ammonia. The amount of ammonia that is lost is small, however, being approximately 0.56 pound per 1000 ampere hours. Thus, in prolonged operation of the cell, liquid ammonia may be added from time to time.

In the second of the above-mentioned embodiments, the cations corresponding to the anode metal displace the metal cations of the catholyte salt which latter cations gain electrons at the cathode plating out thereon as free metal. In recharging the cell of this embodiment, the current is reversed and the plated metal at the cathode recombines with the anions in the catholyte forming the corresponding metal salt and the anode metal ions migrate to the anode plating out thereon. In this system none of the components is lost. In this embodiment the cathode at the outset may be of an inert material of the type described hereinabove or of a metal corresponding to the cation of the catholyte salt, preferably the latter.

Of course, a combination of these embodiments may be employed by employing both an ammonium salt and a metal salt of the type described in the catholyte. In this case, during discharging of the cell, metal is plated out at the cathode and hydrogen is released at the cathode, whereas, during charging of the cell, the metal reforms as the salt in the catholyte and nitrogen is released at the cathode.

A plurality of cells of the type described above may be connected to form a battery. Thus, a plurality of anodes and cathodes, arranged in alternating order, may be connected in serise and/or in parallel for the purpose of developing higher voltage and greater power in accordance with conventional practice with batteries.

The current developed by the cell of the present invention depends upon the effective electrode area, and, in general, the current density will not be less than about 20 milliamperes per square inch. The life of the cell is a function of temperature, concentration and mechanical arrangement of the electrodes. For instance, in the case where the anode metal is lithium, approximately 1700 ampere hours is available for every pound of lithium utilized.

The following examples illustrate further the present invention, and are not intended to limit the scope of the invention in any way.

*Example I*

A cylindrical pot cell form of this invention is constructed readily for discharge in the following manner:

A hermetically sealing steel pressure cylinder internally 6 inches in diameter and 6 inches high is fitted with the following items. The top piece or lid is provided with ⅛ inch standard female pipe thread cathode and anode ports located radially between 1¾ and 2¾ inches from the vertical axis of the cylinder, and an electrically insulated hermetically sealed ½ inch diameter threaded steel cathode contact and supporting rod extending 1½ inches below and 1½ inches above the lid to form the positive terminal. A 3-inch diameter, 5-inch long graphite cylinder is axially bored and threaded to match the lower extension of the cathode contact and supporting rod. This cathode cylinder is then machined to form 8 horizontal circular fins tapering radially from ¼ inch thick at the periphery to a solid core 1 inch in diameter at the bottom to 2 inches in diameter 1 inch from the top. The cathode is then firmly screwed to the lower extension of the cathode contact and supporting bar using a thin even coating of acrylic lacquer as a seal and lubricant. The lacquer solvent is allowed to thoroughly air dry. A cylindrical porous ceramic cup, 4 inches I. D., and ¼ inch thick is placed in the cell pot extending from the lid to ½ inch from the bottom with provision for vertical and lateral support. The top is tightly sealed to the pot.

This assembly, the anolyte, and the catholyte are maintained at −40° F. during the following filling operation. The anode compartment, the outer annular chamber, is filled to a depth of 3 inches with a 4 molar solution of lithium thiocyanate in anhydrous liquid ammonia; then to a total of 5 inches by adding a 10% lithium-ammonia bronze. Concurrently the cathode compartment is filled with a 6 molar solution ammonium thiocyanate in anhydrous liquid ammonia.

The ports are connected by appropriate 1/8 inch steel fittings through a check valve open only when the cell is in an approximately upright position. A combination solvent replenishing port and pressure relief valve is also connected to the cathode port.

Operation of the cell is accomplished by electrical connection of a suitable load between the cell body and the external extension of the cathode contact and supporting rod. Following equalization on standing or mild discharge a potential in the neighborhood of 2½ volts, depending upon the load, is obtained and the cell has a capacity in the order of 75 ampere hours at —40° F.

When this cell is employed at temperatures substantially below room temperature, the prescribed pressure fittings may be eliminated. Also the cell may be jacketed to provide refrigeration which will also obviate the need for pressure fittings.

*Example II*

By substituting, in the cell of Example I, metallic sodium for the lithium bronze and sodium thiocyanate in excess of 4 molar concentration in the ammonia in place of the lithium thiocyanate, the cell operates readily at room temperature without pressure fittings.

Considerable modification is possible in the selection of the various materials for anode, cathode, and electrolyte, as well as in the combinations thereof without departing from the scope of the invention.

We claim:

1. An electric current-producing cell comprising an anode comprising an electropositive metal and a cathode; an anolyte comprising a salt dissolved in an anhydrous liquid comprising anhydrous liquid ammonia the cation of which is a metal corresponding to the electropositive metal of the anode, and a catholyte comprising a salt dissolved in an anhydrous liquid comprising anhydrous liquid ammonia the cation of which is selected from the group consisting of ammonium and metals which develop an electrolytic potential in liquid ammonia at least 0.75 volt less than that developed by the metal of said anode in liquid ammonia.

2. The cell of claim 1 wherein said anode comprises lithium.

3. The cell of claim 1 wherein said anode comprises calcium.

4. The cell of claim 1 wherein said anode comprises magnesium.

5. The cell of claim 1 wherein said anode comprises zinc.

6. An electric current-producing cell comprising an anode comprising an electropositive metal above iron in the electrochemical series selected from the group consisting of lithium, sodium, potassium, caesium, rubidium, calcium, strontium, barium, magnesium, zinc, aluminum, beryllium and manganese, and a cathode; an anolyte comprising a salt dissolved in an anhydrous liquid comprising anhydrous liquid ammonia the cation of which is a metal corresponding to the metal of the anode, and a catholyte comprising a salt dissolved in an anhydrous liquid comprising anhydrous liquid ammonia the cation of which is selected from the group consisting of ammonium and metals which develop an electrolytic potential in liquid ammonia at least 0.75 volt less than that developed by the metal of said anode in liquid ammonia.

7. An electric current-producing cell comprising an anode comprising an electropositive metal and a cathode; an anolyte comprising a salt dissolved in an anhydrous liquid comprising anhydrous liquid ammonia the cation of which is a metal corresponding to the electropositive metal of the anode, and a catholyte comprising an ammonium salt dissolved in an anhydrous liquid comprising anhydrous liquid ammonia.

8. An electric current-producing cell comprising an anode comprising an electropositive metal and a cathode; an anolyte comprising a salt dissolved in an anhydrous liquid comprising anhydrous liquid ammonia the cation of which is a metal corresponding to the electropositive metal of the anode, and a catholyte comprising a salt dissolved in an anhydrous liquid comprising anhydrous liquid ammonia the cation of which is a metal which develops an electrolytic potential in liquid ammonia at least 0.75 volt less than that developed by the metal of said anode in liquid ammonia.

9. An electric current-producing cell comprising an anode comprising an electropositive metal and a cathode comprising a metal which develops an electrolytic potential in liquid ammonia at least 0.75 volt less than that developed by a metal of said anode in liquid ammonia; an anolyte comprising a salt dissolved in an anhydrous liquid comprising anhydrous liquid ammonia the cation of which is a metal corresponding to the electropositive metal of the anode, and a catholyte comprising a salt dissolved in an anhydrous liquid comprising anhydrous liquid ammonia the cation of which is a metal corresponding to the metal of the cathode.

10. The method of generating electric current which comprises contacting an anode comprising an electropositive metal with an anolyte comprising a salt dissolved in an anhydrous liquid comprising anhydrous liquid ammonia the cation of which is a metal corresponding to the electropositive metal of the anode; contacting a cathode with a catholyte comprising a salt dissolved in an anhydrous liquid comprising anhydrous liquid ammonia the cation of which is selected from the group consisting of ammonium and metals which develop an electrolytic potential in liquid ammonia at least 0.75 volt less than that developed by the metal of said anode in liquid ammonia, said catholyte and anolyte being at least in ionic flow relationship, and completing the circuit between the anode and cathode.

11. The method of claim 10 wherein said anode comprises lithium.

12. The method of claim 10 wherein said anode comprises calcium.

13. The method of claim 10 wherein said anode comprises magnesium.

14. The method of claim 10 wherein said anode comprises zinc.

15. The method of generating electric current which comprises contacting an anode comprising an electropositive metal above iron in the electrolytic series selected from the group consisting of lithium, sodium, potassium, caesium, rubidium, calcium, strontium, barium, magnesium, zinc, aluminum, beryllium and manganese with an anolyte comprising a salt dissolved in an anhydrous liquid comprising anhydrous liquid ammonia the cation of which is a metal corresponding to said electropositive metal of the anode; contacting a cathode with a catholyte comprising a salt dissolved in an anhydrous liquid comprising anhydrous liquid ammonia the cation of which is selected from the group consisting of ammonium and metals which develop an electrolytic potential in liquid ammonia at least 0.75 volt less than that developed by the metal of said anode in liquid ammonia, said catholyte and anolyte being in at least ionic flow relationship, and completing the circuit between the anode and cathode.

16. The method of generating electric current which comprises contacting an anode comprising an electropositive metal with an anolyte comprising a salt dissolved in an anhydrous liquid comprising anhydrous liquid ammonia the cation of which is a metal corresponding to the electropositive metal of the anode; contacting a cathode with a catholyte comprising an ammonium salt dissolved in an anhydrous liquid comprising anhydrous liquid ammonia, said catholyte and anolyte being in at least ionic flow relationship, and completing the circuit between the anode and cathode.

17. The method of generating electric current which comprises contacting an anode comprising an electropositive metal with an anolyte comprising a salt dissolved in an anhydrous liquid ammonia the cation of which is a metal corresponding to the electropositive metal and the anode; contacting the cathode with a catholyte comprising a salt dissolved in an anhydrous liquid comprising anhydrous liquid ammonia the cation of which is a metal which develops an electrolytic potential in liquid ammonia of at least 0.75 volt less than that developed by the metal of said anode in liquid ammonia, said catholyte and anolyte being at least in ionic flow relationship, and completing the circuit between the anode and cathode.

18. The method of generating electric current which comprises contacting an anode comprising an electropositive metal with an anolyte comprising a salt dissolved in an anhydrous liquid comprising anhydrous liquid ammonia the cation of which is a metal corresponding to the electropositive metal of the anode; contacting a cathode comprising a metal which develops an electrolytic potential in liquid ammonia at least 0.75 volt less than that developed by the metal of said anode in liquid ammonia with a catholyte comprising a salt dissolved in an anhydrous liquid comprising anhydrous liquid ammonia the cation of which corresponds to said metal of said cathode, said catholyte and anolyte being at least in ionic flow relationship, and completing the circuit between the anode and cathode.

19. An electric current-producing cell comprising an anode comprising an electropositive metal and a cathode; an anolyte comprising a salt dissolved in an anhydrous liquid comprising anhydrous liquid ammonia the cation of which is a metal corresponding to the electropositive metal of the anode, and a catholyte comprising, dissolved in an anhydrous liquid comprising anhydrous liquid ammonia, an ammonium salt and a salt of a metal which develops an electrolytic potential in liquid ammonia at least 0.75 volt less than that developed by the metal of said anode in liquid ammonia.

20. The method of generating electric current which comprises contacting an anode comprising an electropositive metal with an anolyte comprising a salt dissolved in an anhydrous liquid comprising anhydrous liquid ammonia the cation of which is a metal corresponding to the electropositive metal of the anode; contacting a cathode with a catholyte comprising, dissolved in an anhydrous liquid comprising anhydrous liquid ammonia, an ammonium salt and a salt of a metal which develops an electrolytic potential in liquid ammonia at least 0.75 volt less than that developed by the metal of said anode in liquid ammonia, said catholyte and anolyte being at least in ionic flow relationship, and completing the circuit between the anode and cathode.

References Cited in the file of this patent

Kraus; Journal of the American Chemical Society, vol. XXXVI, 1914 January-June, pages 864–877 inclusive.